(12) United States Patent
Chang et al.

(10) Patent No.: US 12,417,119 B2
(45) Date of Patent: Sep. 16, 2025

(54) THERMAL-AWARE TASK SCHEDULING (71) Applicant: MediaTek Inc., Hsinchu (TW)

(72) Inventors: Ya-Ting Chang, Hsinchu (TW); Chih Fu Tsai, Hsinchu (TW); Tai Yu Chen, Hsinchu (TW); Jia-Ming Chen, Hsinchu (TW); Shun-Yao Yang, Hsinchu (TW); Ta-Chang Liao, Hsinchu (TW); Shengquan Wu, Hsinchu (TW); Yu-Chia Chang, Hsinchu (TW)

(73) Assignee: MediaTek, Inc., Hsinchu (TW)

( * ) Notice: Subject to any disclaimer, the term of this patent is extended or adjusted under 35 U.S.C. 154(b) by 640 days.

(21) Appl. No.: 17/524,086

(22) Filed: Nov. 11, 2021

(65) Prior Publication Data

US 2022/0300324 A1     Sep. 22, 2022

Related U.S. Application Data (60) Provisional application No. 63/200,631, filed on Mar. 19, 2021.

(51) Int. Cl.
   G06F 9/46     (2006.01)
   G06F 9/48     (2006.01)
   G06F 11/30    (2006.01)

(52) U.S. Cl.
   CPC ........ G06F 9/4893 (2013.01); G06F 11/3024 (2013.01); G06F 11/3058 (2013.01)

(58) Field of Classification Search
   CPC .................................................. G06F 9/4893
   USPC ........................................................ 718/102
   See application file for complete search history.

(56) References Cited

U.S. PATENT DOCUMENTS

| | | | | |
|---|---|---|---|---|
| 9,507,644 B2* | 11/2016 | Hsiao | ..................... | G06F 9/5094 |
| 9,753,773 B1* | 9/2017 | Borlick | ................. | G06F 9/5094 |
| 10,346,276 B2* | 7/2019 | Spradlin | ............. | G06F 11/3058 |
| 11,442,513 B1* | 9/2022 | Cieslak | ............... | G06F 9/44505 |
| 2006/0070074 A1* | 3/2006 | Maeda | .................. | G06F 9/4893 |
| | | | | 718/100 |
| 2007/0198134 A1* | 8/2007 | Adachi | .................... | G06F 1/329 |
| | | | | 712/E9.063 |

(Continued)

FOREIGN PATENT DOCUMENTS

CN         112395046 A     2/2021

*Primary Examiner* — Mehran Kamran
(74) *Attorney, Agent, or Firm* — Tong J. Lee (57) ABSTRACT A multi-processor system performs thermal-aware task scheduling and task migration. Based on temperature measurements, the system determines one or more thermal conditions of each processor. The thermal conditions include a present temperature, a historical temperature, a predicted temperature, and thermal headroom of the processor. A scheduler identifies a target processor among the processors based on, at least in part, the one or more thermal conditions of each processor, and assigns a task to be executed by the target processor. For task migration, the system detects that a source processor satisfies a task migration criterion by comparing one or more of the thermal conditions of the source processor with corresponding thresholds. The scheduler identifies a target processor based on, at least in part, one or more of the thermal conditions of each processor, and migrates a task from the source processor to the target processor for execution.

14 Claims, 5 Drawing Sheets

(56) References Cited

U.S. PATENT DOCUMENTS

| | | | |
|---|---|---|---|
| 2011/0138395 A1* | 6/2011 | Wolfe | G06F 9/5094 |
| | | | 702/132 |
| 2013/0283289 A1* | 10/2013 | Adinarayan | G06F 9/5094 |
| | | | 718/105 |
| 2014/0173151 A1* | 6/2014 | Guddeti | G06F 1/3203 |
| | | | 718/103 |
| 2014/0245314 A1* | 8/2014 | Inoue | G06F 9/3869 |
| | | | 718/103 |
| 2016/0026507 A1* | 1/2016 | Muckle | G06F 9/5094 |
| | | | 718/104 |
| 2016/0085219 A1* | 3/2016 | Paul | G06N 5/04 |
| | | | 700/299 |
| 2017/0083065 A1* | 3/2017 | Huang | G06F 1/206 |
| 2017/0083382 A1* | 3/2017 | LeBeane | G06F 1/3293 |
| 2017/0083383 A1* | 3/2017 | Rider | G06F 9/4893 |
| 2017/0168532 A1* | 6/2017 | Kim | G06F 1/206 |
| 2017/0371719 A1* | 12/2017 | Majumdar | G06F 9/5094 |
| 2018/0052717 A1* | 2/2018 | Chung | G06F 9/4893 |
| 2018/0107512 A1* | 4/2018 | Borlick | G06F 9/4893 |
| 2019/0129752 A1* | 5/2019 | Chang | G06F 9/4893 |
| 2020/0225985 A1* | 7/2020 | Hayashidera | G06F 9/4881 |
| 2022/0216807 A1* | 7/2022 | Beanato | H02M 1/327 |
| 2022/0300324 A1* | 9/2022 | Chang | G06F 9/5088 |
| 2023/0297443 A1* | 9/2023 | Chung | G06F 9/5016 |
| | | | 718/104 |

* cited by examiner

THERMAL-AWARE TASK SCHEDULING

CROSS-REFERENCE TO RELATED APPLICATIONS

This application claims the benefit of U.S. Provisional Application No. 63/200,631 filed on Mar. 19, 2021, the entirety of which is incorporated by reference herein.

TECHNICAL FIELD

Embodiments of the invention relate to task scheduling based on the temperature information of each processor in a multiprocessor computing system.

BACKGROUND

In a multiprocessor system, a task scheduler assigns tasks to system resources such as processors to improve efficiency, performance, and resource utilization. Conventional task schedulers typically use load-balancing algorithms to determine which processor to handle a task such that workload can be more evenly distributed among the processors.

However, factors other than load balance can also have a significant impact on the performance of a multiprocessor system. For example, high power consumption can reduce battery life in portable devices and generate excessive heat. Another conventional task scheduler aims to optimize power consumption for task scheduling decisions. Such a scheduler may assign tasks to a few processors and keeps the other processors in the system idle to save power. Aggregating task placement on a few processors is counter to load balancing which spreads the workload among processors to improve performance.

State-of-the-art devices utilize throttling techniques to regulate the power and performance of processors. These devices implement dynamic voltage and frequency scaling (DVFS), which is a technique that automatically adjusts the operating frequency and voltage of a processor at runtime. A decrease in the operating frequency and voltage of a processor can reduce the processor's power consumption, but degrades the computing performance of the processor. On the other hand, an increase in the operating frequency and voltage of a processor can improve the computing performance of the processor, but increase the processor's power consumption and heat generation. Excessive heat generation lowers the processor's reliability and can lead to hardware failure.

Thus, improvement to runtime system management is needed to address the many factors affecting the power, reliability, and performance of a multiprocessor system.

SUMMARY

In one embodiment, a method is provided for task scheduling. The method comprises obtaining temperature measurements of a plurality of processors, and determining one or more thermal conditions of each processor. The thermal conditions including a present temperature, a historical temperature, a predicted temperature, and thermal headroom of the processor. The method further comprises identifying a target processor among the processors based on, at least in part, the one or more thermal conditions of each processor; and assigning a task to be executed by the target processor.

In one embodiment, a method is provided for task migration. The method comprises obtaining temperature measurements of a plurality of processors in a multiprocessor system, and detecting that a source processor satisfies a task migration criterion by comparing one or more thermal conditions of the source processor with corresponding thresholds. The thermal conditions include a present temperature, a historical temperature, a predicted temperature, and thermal headroom. The method further comprises identifying a target processor among the processors based on, at least in part, the one or more thermal conditions of each processor; and migrating a task from the source processor to the target processor for execution.

In yet another embodiment, a system comprises multiple processors, multiple temperature sensors to generate temperature measurements of the processors, and circuitry to determine one or more thermal conditions of each processor. The thermal conditions include a present temperature, a historical temperature, a predicted temperature, and thermal headroom of the processor. The system further comprises memory to store instructions which, when executed by the system, cause the system to perform the operations of a scheduler, wherein the scheduler is operative to: identify a target processor among the processors based on, at least in part, the one or more thermal conditions of each processor; and assign a task to be executed by the target processor.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a runtime scheduling mechanism for a multiprocessor system to perform thermal-aware task scheduling. The thermal-aware task scheduling aims to balance the thermal conditions of the processors, where the thermal conditions include, but are not limited to, present temperatures, historical temperatures, predicted temperatures, and thermal headroom of each processor. The thermal-aware task scheduling can prevent hotspots and, therefore, decrease leakage power, reduce cooling costs, and improve system performance and reliability.

The multiple processors in the system described herein may have different thermal resistance due to variations in the fabrication process. Thus, these processors may have different temperatures even if they have the same loading.

The multiprocessor system described herein includes a scheduler, which may be a software module in an operating system (OS). The scheduler selects a target processor from a processor pool to execute a task based on the thermal conditions of each processor in the processor pool. The processor pool may include all of the active processors; alternatively, the processor pool may include all of the processors that are powered on. The task scheduled for execution may be a newly-created task, a task migrated out of a source processor, a task that just woke up, a task re-distributed due to load balancing, etc. The target processor selected by the scheduler may have one or more of the following thermal conditions, including but not limited to, a low present temperature, a low historical temperature, a low predicted temperature, a high thermal headroom, etc. The terms "low" and "high" are used relatively when the thermal conditions of the target processor are compared against those of the other processors in the processor pool.

In one embodiment, the scheduler also performs task migration from a source processor to a target processor. The scheduler may invoke task migration when the source processor's thermal conditions meet at least one of the following criteria, including but not limited to: the present runtime temperature of the processor exceeds a first threshold, the historical temperature of the processor exceeds a second threshold, the predicted temperature of the processor exceeds a third threshold, and the thermal headroom of the processor is lower than a fourth threshold. Alternative to and/or in addition to task migration, a dynamic voltage frequency scaling (DVFS) controller in the system may reduce the operating frequency and voltage of the source processor when the source processor's thermal conditions meet at least one of the aforementioned criteria.

In some systems, a "processor" may be a central processing unit (CPU), a digital signal processor (DSP), a multimedia processor, a graphics processing unit (GPU), a vector processor, or other general-purpose or special-purpose processing circuitry. In some systems, a processor may be the same as a "core" or "processor core," while in some other systems a processor may include multiple cores. It is understood that the runtime scheduling mechanism described herein is applicable to any types of processors.

The system described herein may be implemented in an electronic device, such as a smartphone, a tablet, a wearable device, a gaming device, a media device, a server, a desktop device, etc. That is, any electronic device using the disclosed task scheduling method falls within the scope of the present invention.

Figure 1:
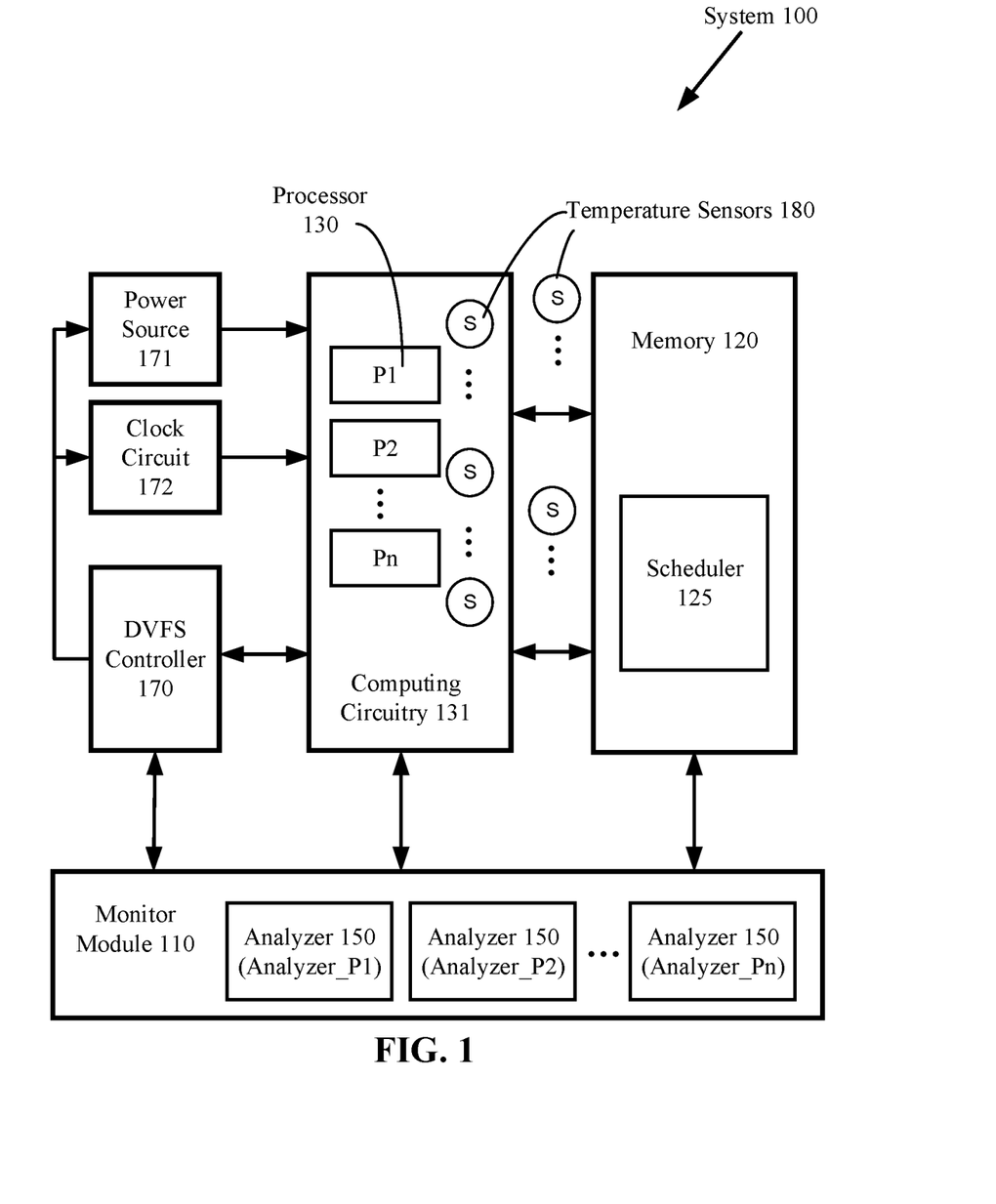
FIG. 1 illustrates a multiprocessor system according to one embodiment.

FIG. 1 illustrates an example of a multiprocessor system ("the system 100") according to one embodiment. The system 100 includes computing circuitry 131 which further includes multiple processors 130 (e.g., P1, P2, . . . , Pn). Additional circuitry may also be in the system 100, but they are not germane to the present invention. The processors 130 may have the same processor type. Processors are of the same process type when they have not only the same instruction set architecture (ISA), but also the same microarchitecture; i.e., the same hardware implementation such as the same number of registers, the same number of pipeline stages, the same branch predictor, the same cache circuitry design, etc. Processors with the same microarchitecture deliver the same or substantially the same computing performance (e.g., measured by million instructions per second (MIPS)) and power efficiency (e.g., measured by power consumption). However, processors with the same microarchitecture may have different thermal resistance due to variations in the fabrication process. Thus, the same loading in each processor of the same processor type may induce different temperatures among the processors. Alternatively, the processor 130 may have different processor types with the same ISA, such that a task can be assigned to any of the processors 130 for execution.

In one embodiment, the system 100 includes a number of temperature sensors 180 (each denoted as S) distributed in the computing circuitry 131 and throughout the system 100 to measure the temperature and the environmental temperature of each processor 130. Hardware placement in the system 100 may cause the environmental temperature to be unevenly distributed in the system 100. Furthermore, the temperature of a first processor 130 may have an impact on the environmental temperature of a second processor 130 that is physically adjacent to the first processor 130.

Each processor 130 receives power from a power source 171 (e.g., voltage regulators) and clock signals from clock circuitry 172. In one embodiment, the processors 130 can be integrated on a single integrated circuit die, or on separate dies in a multiple-circuit package. In one embodiment, the system 100 may be integrated as a system-on-a-chip (SOC).

The system 100 includes a memory 120, which may include on-chip and off-chip memory devices such as dynamic random access memory (DRAM), static RAM (SRAM), flash memory, and other volatile or non-volatile memory devices. In one embodiment, the system 100 is connected to networks (e.g., a personal area network, a local area network, a wide area network, etc.). It is understood the embodiment of FIG. 1 is simplified for illustration purposes. Additional hardware components may be included.

In one embodiment, the system 100 includes a dynamic voltage frequency scaling (DVFS) controller 170 to control the operating point (e.g., frequency and voltage) of the activated processors 130. The term "activated" herein is equivalent to "powered on." The DVFS controller 170 may control the clock circuit 173 to individually increase or decrease the clock frequency of each processor 130, and may control the power source 172 to individually increase or decrease the voltage supplied to each processor 130.

In one embodiment, the system 100 includes a monitor module 110 to gather and analyze measurements and sensor data, such as the temperature reading of the sensors 180. The monitor module 110 also communicates with meters, monitors, and/or counters implemented in hardware and/or software to monitor the operation and status of each processor 130. For example, the monitor module 110 may gather the present temperature, the environmental temperature, the power consumption, the amount of workload, the operations executed on the processor, the execution time, powered on or off, active or idle, the operating frequency and voltage, and the like, of each processor 130 at runtime. The monitor module 110 analyzes the gathered information to obtain or estimate the thermal conditions of each processor 130.

In one embodiment, the monitor module 110 includes a plurality of thermal information analyzers (TIAs) 150, also referred to as the analyzers 150. Each analyzer 150 analyzes the information gathered by the monitor module 110 regarding a corresponding processor 130; e.g., Analyzer_P1 for P1, Analyzer_P2 for P2, ..., Analyzer_Pn for Pn. The output of each analyzer 150 indicates the thermal conditions of the corresponding processor 130, and is provided to a scheduler 125 for task scheduling. The output of each analyzer 150 may also be provided to the DVFS controller 170 for adjustment of the operating point (i.e., voltage and frequency) of the corresponding processor 130. Although the analyzers 150 are shown as modules separate from the scheduler 125, in some embodiments a portion of the analyzers' functionalities may be built into the scheduler 125.

One or more of the DVFS controller 170, the monitor module 110, and the analyzers 150 may be implemented in hardware circuitry, software executed by hardware circuitry, or a combination of hardware and software. The hardware circuitry may be special-purpose or general-purpose hardware. Software may be stored on any non-transitory computer-readable medium for use by the system 100 or by methods executed by the system 100. In one embodiment, the monitor module 110 may be a co-processing circuit that executes software. Alternatively, the software may be executed by one or more of the computing circuitry 131.

In one embodiment, the scheduler 125 dispatches tasks to, and removes tasks from, the processors 130 based on runtime thermal conditions of the processors 130. In this embodiment, the scheduler 125 may be part of an OS stored on a non-transitory computer-readable medium for supporting multiprocessor task scheduling. The scheduler 125 may run on one or more of the processors 130 in the system 100. In the example of FIG. 1, memory 120 may include a non-transitory computer-readable medium to store instructions, which, when executed by the system 100, performs the operations of the scheduler 125 based on runtime thermal conditions of the processors 130. Although the scheduler 125 is shown as a module in the memory 120, it is understood that one or more of the processors 130 may load the scheduler 125 into its local (e.g., on-processor) memory at runtime for execution.

In one embodiment, the scheduler 125 performs task scheduling according to thermal-aware policies. According to the thermal-aware policies, the decisions on the target processor selection for task execution and the decisions on task migration from a source processor are based on the thermal conditions of each processor 130. The scheduler 125 is responsible for task assignment every time there is a new task, a wake-up task, or otherwise a not-yet-scheduled task waiting to be scheduled. The scheduler 125 determines to which processor to assign the task based on the thermal conditions of the processors 130. The scheduler 125 is also responsible for task migration. In some embodiments, task migration is performed when a thermal condition of a processor satisfies a criterion; e.g., when a threshold temperature is exceeded. When such a criterion is satisfied, the scheduler 125 transfers one or more tasks from the processor to a target processor, where the target processor is selected based on the thermal conditions of the processors 130.

Figure 2:
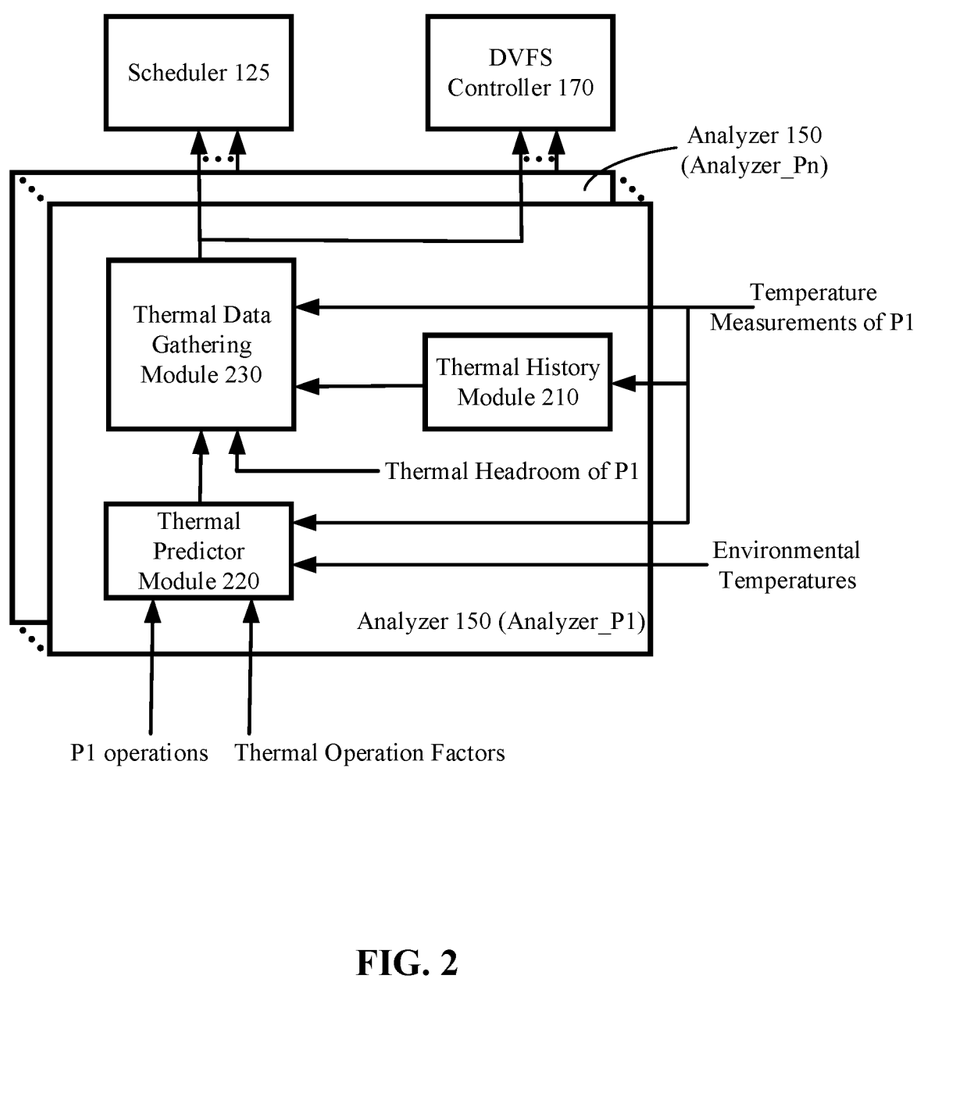
FIG. 2 is a block diagram illustrating an analyzer for analyzing thermal information of a processor according to one embodiment.

FIG. 2 is a block diagram illustrating the analyzer 150 for analyzing thermal information of a processor according to one embodiment. The functional units of Analyzer_P1 are shown in FIG. 2 as an example. It is understood that the other analyzers 150 (Analyzer_P2, ..., Analyzer_Pn) have the same functional units and the same functions as Analyzer_P1. In one embodiment, each analyzer 150 includes a thermal history module 210, a thermal predictor module 220, and a thermal data gathering module 230. The output of the thermal data gathering module 230 from each processor is provided to the scheduler 125 and the DVFS controller 170. It is understood that the following description with respect to the analyzer 150 for P1 applies to the other processors 130 in the system 100.

Figure 3:
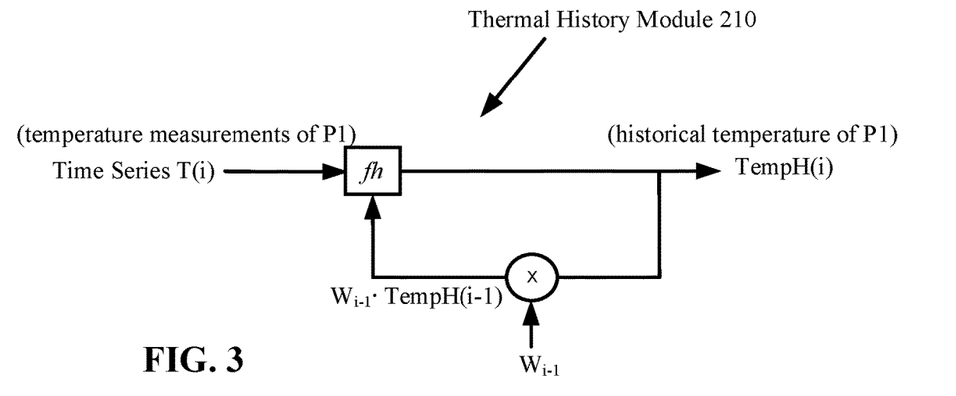
FIG. 3 is a block diagram illustrating a thermal history module according to one embodiment.

FIG. 3 is a block diagram illustrating the thermal history module 210 according to one embodiment. Referring to FIG. 2 and FIG. 3, the thermal history module 210 receives temperature measurements of processor P1 at regular time intervals from the sensors 180. The received temperature measurements form a time series T(i), where i is a running index representing time. The thermal history module 210 receives T(i) as input and outputs a time series of historical temperature TempH(i). The historical temperature may be calculated using weighted past temperature measurements of P1.

In one embodiment, the thermal history module 210 may calculate a moving average of past temperature values of P1. For example, the thermal history module 210 may apply a mathematical operator (denoted as fh) on each T(i) and $W_{i-1}$·TempH(i−1), where is a weighting factor. In one embodiment, the weight may be a constant value W for all i's, such as a value between 0 and 1. In one embodiment, the mathematical operator fh applies to T(i) and W·TempH(i−1) may produce (1−W)·T(i)+W·TempH(i−1), which is the exponential moving average of P1's past temperature measurements. In one embodiment, the thermal history module 210 may apply a sliding window to the past temperature measurements of P1, so the temperature measurements older than a predetermined time period are discarded.

Figure 4:
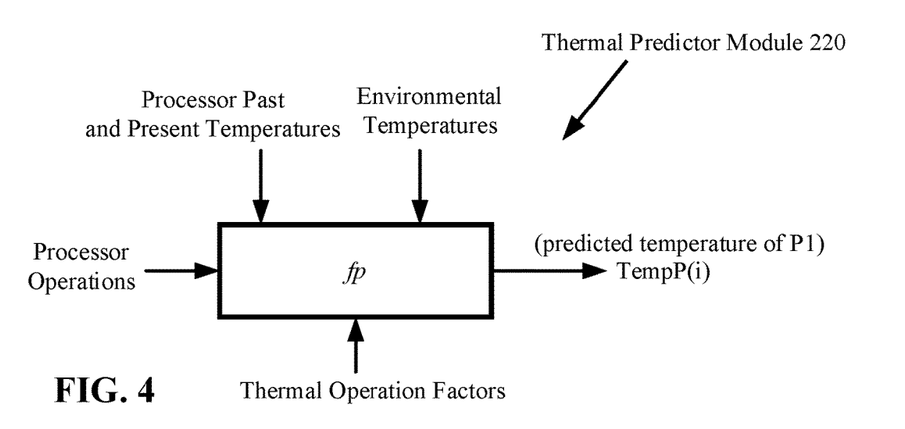
FIG. 4 is a block diagram illustrating a thermal predictor module according to one embodiment.

FIG. 4 is a block diagram illustrating the thermal predictor module 220 according to one embodiment. Referring to FIG. 2 and FIG. 4, the thermal predictor module 220 applies an operator fp to the input to generate a time series of predicted temperature values TempP(i) for P1, where i is a running index representing time. In one embodiment, the thermal predictor module 220 may calculate the predicted temperature of P1 as a temperature trend (e.g., temperature increase, decrease, or no change) based on measurements of past temperatures and the present temperature of P1. The calculation of the temperature trend for P1 may also be based on the environmental temperature of P1, operations being executed on P1, and thermal operation factors such as the relationship between power consumption and the executed operations and workload, the relationship between power consumption and temperature, etc. The temperature trend may be calculated for one or more next time intervals. When the temperature trend is calculated for N next time intervals, the thermal predictor module 220 may select or identify a temperature value from the temperature trend in the N next time intervals as the predicted temperature for P1.

In one embodiment, the thermal predictor module 220 may calculate the predicted temperature of P1 based on P1's loading or power consumption caused by the loading.

Referring back to FIG. 2, the thermal data gathering module 230 may receive one or more of P1's thermal conditions: the present temperature reading of P1, the historical temperature TempH(i) of P1, and the predicted temperature TempP(i) of P1 as input. The thermal data gathering module 230 may also receive the thermal headroom of P1 as input. The thermal headroom indicates the closeness of P1's present temperature or power consumption to the allowed temperature or allowed power consumption, where the allowed temperature and the allowed power consumption are upper limits for P1 to operate safely.

With respect to power consumption, the thermal headroom of P1 can be calculated by subtracting present power consumption from the allowed power consumption of P1. The present power consumption can be obtained from power meters or the loading of P1. With respect to temperature, the thermal headroom of P1 can be calculated by subtracting the present temperature of P1 from the allowed temperature of P1.

The thermal data gathering module 230 may gather one or more of P1's thermal conditions (e.g., the thermal headroom, the processor's present, historical, and predicted temperatures, etc.) and output the gathered data to the scheduler 125 for task assignment and to the DVFS controller 170 for voltage and frequency adjustment. In one embodiment, the system 100 (FIG. 1) may be configured at runtime to measure only one of the thermal conditions (e.g., each processor's present temperatures), and the thermal data gathering module 230 of each processor gathers the measured thermal condition for output to the scheduler 125 and the DVFS controller 170. Alternatively, the system 100 may be configured at runtime to measure more than one or all of the thermal conditions, and the thermal data gathering module 230 of each processor gathers those measured thermal conditions for output to the scheduler 125 and the DVFS controller 170.

Based on the thermal conditions received from all of the processors, the scheduler 125 generates a priority indication indicating a target processor for task assignment. For example, the priority indication may indicate the processor having the lowest present, historical, or predicted temperature. Thus, the processor 130 having the lowest present, historical, or predicted temperature and operating within the allowed temperature and power consumption can be chosen by the scheduler 125 as a target processor for task scheduling. Alternatively, the scheduler 125 may generate the priority indication that indicates the processor having a combination of two or more of the measured thermal conditions. The priority indication may be updated every time interval.

As another example, the scheduler 125 may generate a priority indication indicating the processor having the largest thermal headroom. The scheduler 125 chooses a target processor to assign a task according to the priority indication. The target processor selection may be based on additional factors such as task placement restriction, etc. In some scenarios, a processor with a higher temperature and a larger thermal headroom may be chosen over another processor with a lower temperate and a smaller thermal headroom as the scheduling target processor, where the temperature can be the processor's present, historical, or predicted temperature.

Figure 5:
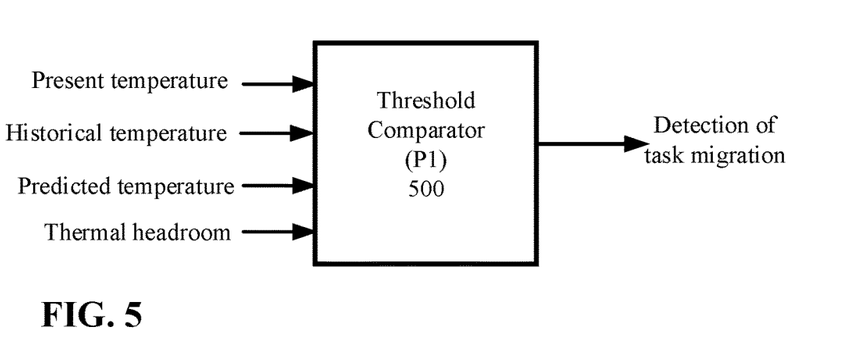
FIG. 5 is a block diagram illustrating a threshold comparator according to one embodiment.

In one embodiment, each analyzer 150 may further include a threshold comparator 500. FIG. 5 is a block diagram illustrating the threshold comparator 500 according to one embodiment. The threshold comparator 500 for P1 is responsible for identifying that P1 meets a task migration criterion. For example, when P1's present, historical, or predicted temperature exceeds Th1, Th2, and Th3, respectively, or when P1's thermal headroom is below Th4, P1 is identified as meeting a task migration criterion. Here, Th1, Th2, Th3, and Th4 are threshold values. Some of the threshold values may be equal to each other.

The threshold comparator 500 detects whether or not P1 satisfies a task migration criterion by comparing one or more thermal conditions of P1 with corresponding thresholds, where the thermal conditions include the present temperature, the historical temperature, the predicted temperature, and the thermal headroom of P1. When any of the thermal conditions reaches (or breaches) the corresponding threshold, P1 is identified as a source processor and the scheduler 125 is notified to migrate one or more tasks running on P1 to a target processor for execution.

In one embodiment, the target processor can be selected by the scheduler 125 based on priority indications previously described. In another embodiment, the DVFS controller 170 may be notified to reduce the operating frequency and voltage of P1. The DVFS controller 170 may raise the voltage and frequency of P1 when P1 no longer meets any of the task migration criteria. For example, when P1's present, historical, and predicted temperatures are below Th1, Th2, and Th3, respectively, and when P1's thermal headroom exceeds Th4, P1 is identified as no longer meeting any of the task migration criteria.

Figure 6:
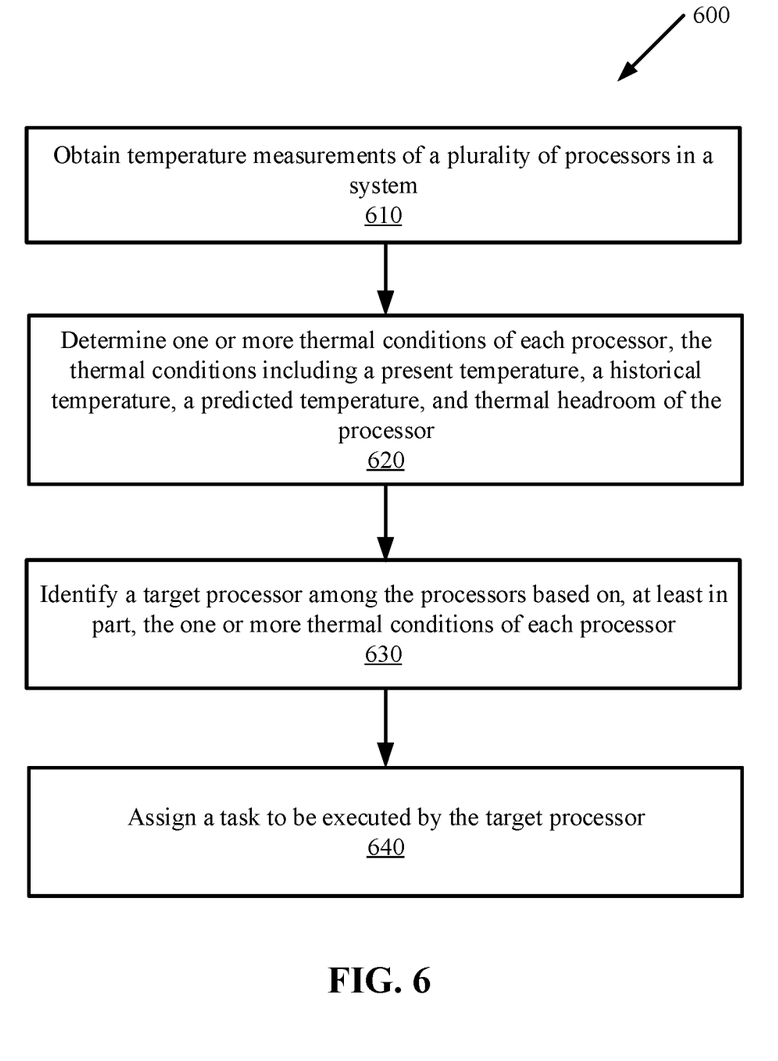
FIG. 6 is a flow diagram illustrating a method for thermal-aware task scheduling in a multiprocessor system according to one embodiment.

FIG. 6 is a flow diagram illustrating a method 600 for thermal-aware task scheduling in a multiprocessor system according to one embodiment. The method 600 may be performed by the multiprocessor system 100 of FIG. 1.

The method 600 begins at step 610 when the system obtains temperature measurements of a plurality of processors in the system. The system at step 620 determines one or more thermal conditions of each processor, where the thermal conditions include a present temperature, a historical temperature, a predicted temperature, and the thermal headroom of the processor. The system at step 630 identifies a target processor among the processors based on, at least in part, the one or more thermal conditions of each processor. The scheduler at step 640 assigns a task to be executed by the target processor.

Figure 7:
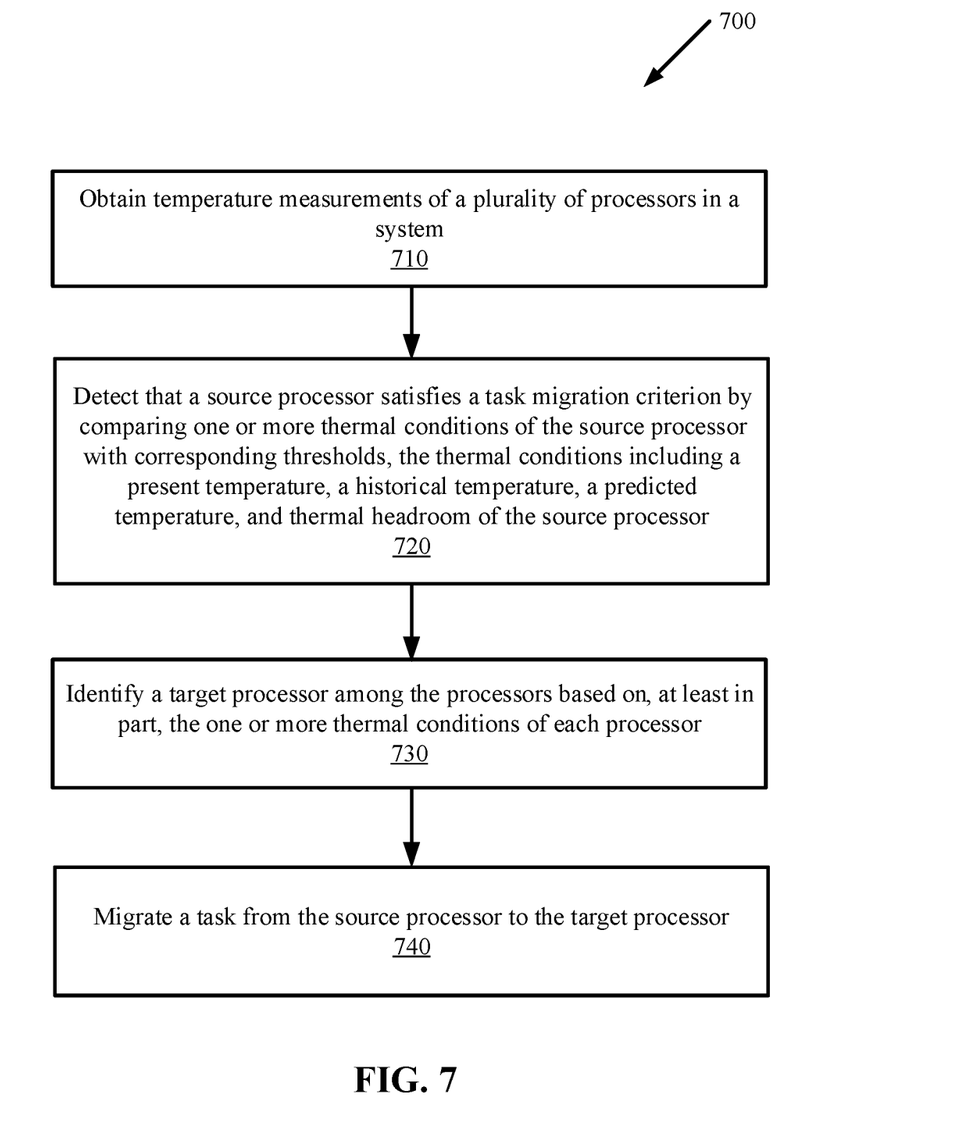
FIG. 7 is a flow diagram illustrating a method for thermal-aware task migration in a multiprocessor system according to one embodiment.

FIG. 7 is a flow diagram illustrating a method 700 for thermal-aware task migration in a multiprocessor system according to one embodiment. The method 700 may be performed by the multiprocessor system 100 of FIG. 1.

The method 700 begins at step 710 when the system obtains temperature measurements of a plurality of processors in the system. The system at step 720 detects that a source processor satisfies a task migration criterion by comparing one or more thermal conditions of the source processor with corresponding thresholds. The thermal conditions include a present temperature, a historical temperature, a predicted temperature, and thermal headroom. The system at step 730 identifies a target processor among the processors based on, at least in part, the one or more thermal conditions of each processor. The system at step 740 migrates a task from the source processor to the target processor for execution.

The operations of the flow diagrams of FIGS. 6 and 7 have been described with reference to the exemplary embodiments of FIGS. 1-5. However, it should be understood that the operations of the flow diagrams of FIGS. 6 and 7 can be performed by embodiments of the invention other than the embodiments of FIGS. 1-5, and the embodiments of FIGS. 1-5 can perform operations different than those discussed with reference to the flow diagrams. While the flow diagrams of FIGS. 6 and 7 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for task scheduling, comprising:
   obtaining temperature measurements including a present temperature and an environmental temperature of each of a plurality of processors, wherein the environmental temperature of the processor is affected, at least in part, by a temperature of another processor physically adjacent to the processor;
   determining thermal conditions of each processor, the thermal conditions including the present temperature, a historical temperature, a predicted temperature, and thermal headroom of the processor, wherein the predicted temperature of the processor is calculated based on, at least in part, the environmental temperature of the processor and a temperature trend based on measurements of past temperatures and the present temperature of the processor;
   when detecting a wake-up task to be scheduled, selecting a target processor among the processors based on, at least in part, one or more of the thermal conditions including the predicted temperature of each processor at runtime; and
   assigning the wake-up task to the target processor for execution.

2. The method of claim 1, wherein determining the thermal conditions further comprises:
   calculating, for each processor, the historical temperature using weighted past temperature measurements of the processor.

3. The method of claim 1, wherein determining the thermal conditions further comprises:
   calculating, for each processor, the predicted temperature based on the environmental temperature, operations being executed on the processor, and factors that relate the operations to temperatures of the processor.

4. The method of claim 1, further comprising:
   calculating the temperature trend for one or more next time intervals; and
   identifying a temperature value from the temperature trend as the predicted temperature.

5. The method of claim 1, wherein determining the thermal conditions further comprises:
   calculating, for each processor, the predicted temperature based on loading of the processor or power consumption caused by the loading.

6. The method of claim 1, wherein determining the thermal conditions further comprises:
   obtaining, for each processor, a present power consumption based on power meters or loading of the processor; and
   calculating, for each processor, the thermal headroom of the processor by subtracting present power consumption from allowed power consumption.

7. The method of claim 1, wherein determining the thermal conditions further comprises:
   calculating, for each processor, the thermal headroom of the processor by subtracting the present temperature from allowed temperature.

8. The method of claim 1, wherein selecting the target processor further comprises:
   collecting, by a scheduler, the thermal conditions from each processor; and
   identifying the target processor by the scheduler.

9. The method of claim 1, further comprising:
   detecting that a source processor satisfies a task migration criterion by comparing one or more of the thermal conditions of the source processor with corresponding thresholds; and
   migrating a task from the source processor to the target processor for execution.

10. The method of claim 8, further comprising:
    decreasing an operating frequency of the source processor.

11. A system, comprising:
    a plurality of processors;
    a plurality of temperature sensors to generate temperature measurements including a present temperature and an environmental temperature of each processor, wherein the environmental temperature of the processor is affected, at least in part, by a temperature of another processor physically adjacent to the processor;
    circuitry to determine thermal conditions of each processor, the thermal conditions including the present temperature, a historical temperature, a predicted temperature, and thermal headroom of the processor, wherein the predicted temperature of the processor is calculated based on, at least in part, the environmental temperature of the processor and a temperature trend based on measurements of past temperatures and the present temperature of the processor; and
    memory to store instructions which, when executed by the system, cause the system to perform the operations of a scheduler, wherein the scheduler is operative to:
      when detecting a wake-up task to be scheduled, select a target processor among the processors based on, at least in part, one or more of the thermal conditions including the predicted temperature of each processor at runtime; and
      assign the wake-up task to the target processor for execution.

12. The system of claim 11, wherein the historical temperature of each processor is calculated using weighted past temperature measurements of the processor.

13. The system of claim 11, wherein the predicted temperature of each processor is calculated based on the environmental temperature, operations being executed on the processor, and factors that relate the operations to temperatures of the processor.

14. The system of claim 11, wherein the scheduler is further operative to:
    detect that a source processor satisfies a task migration criterion by comparing one or more of the thermal conditions of the source processor with corresponding thresholds; and migrate a task from the source processor to the target processor for execution.

* * * * *